United States Patent
O'Neill et al.

(10) Patent No.: US 7,421,281 B2
(45) Date of Patent: Sep. 2, 2008

(54) METHODS AND APPARATUS FOR SUPPORTING GROUP COMMUNICATIONS

(75) Inventors: Alan O'Neill, West Hindmarsh (AU); M. Scott Corson, Chatham, NJ (US); Vincent Park, Budd Lake, NJ (US); Michaela Vanderveen, Tracy, CA (US); George Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 604 days.

(21) Appl. No.: 11/126,998

(22) Filed: May 10, 2005

(65) Prior Publication Data

US 2005/0213559 A1 Sep. 29, 2005

Related U.S. Application Data

(62) Division of application No. 10/180,627, filed on Jun. 26, 2002, now Pat. No. 6,922,547.

(60) Provisional application No. 60/301,239, filed on Jun. 27, 2001.

(51) Int. Cl.
*H04L 12/28* (2006.01)
(52) U.S. Cl. .................... 455/519; 455/17; 370/351
(58) Field of Classification Search .................. 455/17, 455/519; 370/351
See application file for complete search history.

(56) References Cited

U.S. PATENT DOCUMENTS

| | | | |
|---|---|---|---|
| 4,679,244 A | 7/1987 | Kawasaki et al. | |
| 4,833,701 A | 5/1989 | Comroe et al. | |
| 4,901,307 A | 2/1990 | Gilhousen et al. | |
| 5,056,109 A | 10/1991 | Gilhousen et al. | |
| 5,095,529 A | 3/1992 | Comroe et al. | |
| 5,128,938 A | 7/1992 | Borras | |

(Continued)

FOREIGN PATENT DOCUMENTS

WO 9512297 5/1995

(Continued)

OTHER PUBLICATIONS

"SIP: Session Initiation Protocol", IEFT Network Wording Group, Request for Comments:3261, (Jun. 2002) pp. 1-39.

*Primary Examiner*—William D Cumming
(74) *Attorney, Agent, or Firm*—Michael P. Straub; Kam T. Tam; Thomas R. Rouse (57) ABSTRACT

Group communications methods and apparatus are described. In particular, methods for granting a mobile device access to a communications resource, e.g., the right to transmit data, associated with a group are described. User requests for the communications resource are suppressed by the corresponding mobile device, for periods during which the communications resource has been granted to another mobile device. A mobile device may store a suppressed user request so that a resource request signal may be transmitted after the communications resource has been released by the mobile device that was previously granted the resource. In this manner requests that cannot be granted are not transmitted, increasing communications efficiency as compared to systems where requests are not suppressed at the mobile devices. A priority scheme is used in some embodiments to determine whether or not a request should be suppressed while another device has been granted the communications resource.

9 Claims, 5 Drawing Sheets

U.S. PATENT DOCUMENTS

| | | |
|---|---|---|
| 5,267,261 A | 11/1993 | Blakeney, II et al. |
| 5,325,432 A | 6/1994 | Gardeck et al. |
| 5,369,781 A | 11/1994 | Comroe et al. |
| 5,387,905 A | 2/1995 | Grube et al. |
| 5,420,909 A | 5/1995 | Ng et al. |
| 5,450,405 A | 9/1995 | Maher et al. |
| 5,461,645 A | 10/1995 | Ishii |
| 5,463,617 A | 10/1995 | Grube et al. |
| 5,465,391 A | 11/1995 | Toyryla |
| 5,473,605 A | 12/1995 | Grube et al. |
| 5,491,835 A | 2/1996 | Sasuta et al. |
| 5,511,232 A | 4/1996 | O'Dea et al. |
| 5,513,381 A | 4/1996 | Sasuta |
| 5,542,108 A | 7/1996 | Sasuta |
| 5,566,366 A | 10/1996 | Russo et al. |
| 5,590,396 A | 12/1996 | Henry |
| 5,594,948 A | 1/1997 | Talarmo et al. |
| 5,625,882 A | 4/1997 | Vook et al. |
| 5,627,882 A | 5/1997 | Chien et al. |
| 5,634,197 A | 5/1997 | Paavonen |
| 5,884,196 A | 3/1999 | Lekven et al. |
| 5,903,559 A | 5/1999 | Acharya et al. |
| 6,021,123 A | 2/2000 | Mimura |
| 6,021,326 A | 2/2000 | Nguyen |
| 6,275,712 B1 | 8/2001 | Gray et al. |
| 6,308,080 B1 | 10/2001 | Burt et al. |
| 6,400,703 B1 | 6/2002 | Park et al. |
| 6,498,934 B1 | 12/2002 | Muller |
| 6,546,252 B1 | 4/2003 | Jetzek et al. |
| 6,611,506 B1 | 8/2003 | Huang et al. |
| 6,690,936 B1 | 2/2004 | Lundh |
| 6,922,547 B2 * | 7/2005 | O'Neill et al. ................ 455/17 |
| 2003/0003938 A1 * | 1/2003 | O'Neill et al. .............. 455/519 |
| 2003/0117969 A1 | 6/2003 | Koo et al. |
| 2005/0213559 A1 * | 9/2005 | O'Neill et al. .............. 370/351 |

FOREIGN PATENT DOCUMENTS

| | | |
|---|---|---|
| WO | 9627993 | 9/1996 |
| WO | 9712475 | 4/1997 |

* cited by examiner

METHODS AND APPARATUS FOR SUPPORTING GROUP COMMUNICATIONS

RELATED APPLICATIONS

The present application is a divisional of U.S. patent application Ser. No. 10/180,627, filed on Jun. 26, 2002 now U.S. Pat. No. 6,922,547 and titled "METHODS AND APPARATUS FOR SUPPORTING GROUP COMMUNICATIONS", which claims the benefit of U.S. Provisional Patent Application Ser. No. 60/301,239, filed on Jun. 27, 2001, titled "METHODS AND APPARATUS FOR USING SIP SIGNALING TO SUPPORT GROUP COMMUNICATIONS OVER FLASH-OFDM".

FIELD OF THE INVENTION

The present invention relates to methods and apparatus for supporting group communications.

BACKGROUND

A group communications system allows a plurality of users to participate in a group communication session with each other through a plurality of corresponding user communication devices interconnected through a communications network. Such a system may also include a controller device to facilitate coordination of communications in the group and access to communication resources associated with the group, i.e., the control device may assist with "floor control". One purpose of floor control is to ensure that only one user communication device is transmitting data at any one time, while other user communication devices associated with the group communication session only receive data during the same time. Floor control also provides the method with which the right to transmit data and access to communication resources associated with the group are shared between the plurality of user devices. This typically involves user communication devices sending "floor request" signals to the controller device and the controller device "granting the floor" to user devices according to some policy, e.g., first come first served.

While floor control functions can apply to any form of data communications, they are particularly useful in voice communications, since during a conversation amongst a group of people it is beneficial if there is only one speaker at any one time. Note that digitized and packetized voice is simply a subset of data communications.

The one sender many receivers property of a group communications session is exploited so that communication resources for sending data are only required by a single user communication device at a time, while communication resources for receiving data are required by the other user communication devices in the group. This is particularly beneficial when communication resources from the network to the user communication devices (downlink) are relatively in abundance, while communication resources from the user communication devices towards the network (uplink) are somewhat constrained. This is typical of cellular communications systems, which use wireless technology between the user communication devices and the network.

Some cellular communication systems, also allow a user communication device to operate in either a receive-only mode or a receive-transmit mode, where a user communication device that is in the receive-only mode consumes less system resources. In such systems, operation in the receive-transmit mode requires the use of additional control channels and thus increases overhead. Typically, transition of a user communication device between modes of operation is not instantaneous; therefore, if a user communication device transitions to the receive-transmit mode even to send a small amount of traffic, the device may remain in that mode consuming a larger percentage of system resources for a longer period of time. Secondly, system resources may also be consumed for signaling associated with the transitions between modes. Finally, a user communication device may consume power at a higher rate while in the receive-transmit mode. Thus the cost associated with sending even a small amount of traffic in the uplink may be significant and should be avoided when possible.

While group communications may be inherently well suited for cellular communication systems that have an ability to send downlink traffic to multiple user communication devices simultaneously, there is need for a floor control system that minimizes uplink signaling. In particular, there is a need for floor control system that minimizes the likelihood that a user communication device will transition to receive-transmit mode to send a floor request signal that will be rejected by the controller device.

SUMMARY OF THE INVENTION

Methods and apparatus of the present invention can be used to support group communications between a plurality of end nodes interconnected via a communications system, e.g., network. End nodes may be implemented as wireless devices that include receiver and transmitter circuitry to support communications with wireless access nodes via a wireless communications channel. End nodes may be, for example, mobile devices and may include an IP host protocol stack. The access nodes may be, for example, base stations in a cellular communications system and may also function as an IP access router. The communications system, e.g., network, implemented in accordance with the invention includes a group communications controller node that assists in coordination of group communications and controls access to communications resources associated with a group and/or group communications session. The group communications controller node may be, for example, a server and may also include an IP protocol stack. IP packets may be used for the exchange of both data and control signaling between nodes in the system. In either case, delivery of IP packets from a source node to the targeted destination node or nodes may use either unicast or multicast addressing and delivery mechanisms. Control signaling implemented in accordance with the present invention may be, for example, based on the Session Initiation Protocol (SIP). In various embodiments, the group communications controller transmits resource grant messages and resource release messages using an IP multicast routing address corresponding to members of a group.

An end node may include an input/output interface and one or more input/output devices that enable a user to control the device and use it for communications with the users of other similar devices. The end node may be, for example, a wireless phone with a keypad, display, microphone and speaker. In response to user input, e.g., a user resource request, an end node may exchange signaling with the group communications controller node to coordinate access to resources, e.g., the right to transmit data, associated with a group or group communications session. As part of the exchange signaling the end node may transmit a resource request to the controller node.

An end node implemented in accordance with the present invention is capable of operating such that it suppresses user requests for group communications resources, when the resource request would not be granted by the group communications controller node. This suppress mode of operation may be entered by an end node in response to a message from the controller node indicating a resource grant to another end node in the group. The use of a suppress mode can be advantageous when the cost associated with transmission of even a small amount of information by an end node is relatively high.

In accordance with the present invention, during the suppress mode of operation an end node may store user requests. In cases where user requests are stored, the end node may later transmit a request for a group communications resources corresponding to the stored user request, after the group communications controller node has signaled that the resources have been released by the node to which they were previously granted. In accordance with the invention, the receipt of a release signal will cause an end node in the suppress mode to transition to another, e.g., idle, mode. This approach to group communications has the advantage of minimizing user interaction required to obtain group communications resources and minimizing the delay associated with obtaining resources. The group communications controller node may also further coordinate and control access to group communications resources by using scheduling techniques or methods to determine the order and timing of sending resource release signals to the end nodes within a group. Depending on the scheduling technique or method, this can be used as a way of ensuring fairness or providing priority access to group communications resources.

Priority information may be maintained by end nodes and the group communications controller node. In some embodiments, priority information is included in control signaling between nodes to provide greater priority access control. The use of such additional priority information enables an end node to selectively suppress user resource requests, based on the relative priority of the requesting user or end node and the priority at which the group communications resource has been granted. Thus, even if a group communications resource is currently granted to a first user, a second user with sufficient priority may preempt the prior grant.

Numerous additional embodiments, features, and advantages of the methods and apparatus of the invention are discussed in the detailed description that follows.

DETAILED DESCRIPTION

Figure 1:
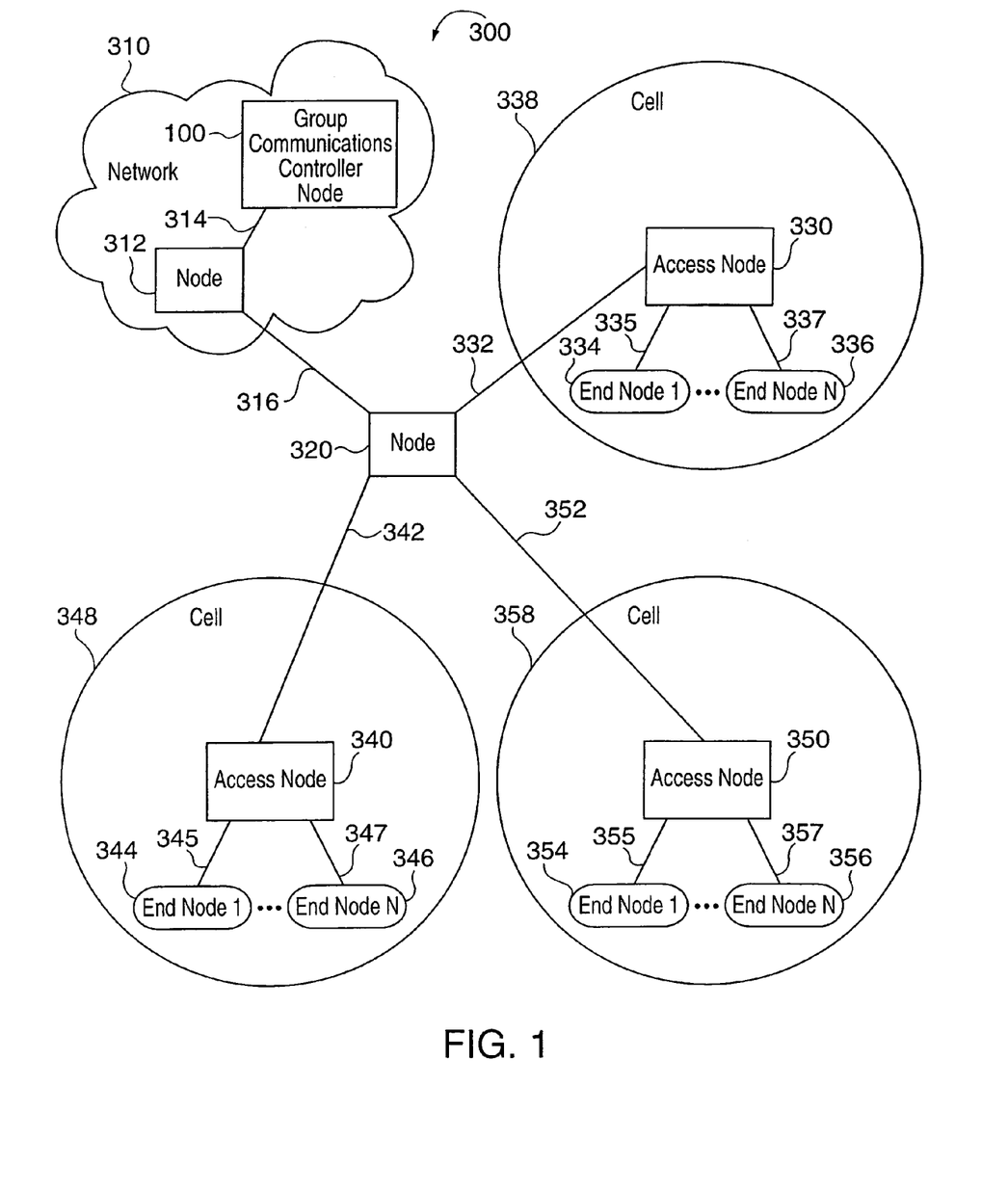
FIG. 1 illustrates a network diagram of a group communications system implemented in accordance with an exemplary embodiment of the invention.

FIG. 1 illustrates an exemplary system 300 in which a plurality of end nodes 334, 336, 344, 346, 354, 356, implemented in accordance with the present invention, can participate in group communication sessions coordinated by a group communications control node 100, also implemented in accordance with the present invention. Each end node 334, 336, 344, 346, 354, 356 may be a member of one or more communication groups and is capable of initiating a group communication session for the communication groups of which it is a member. The group communications controller node 100 is responsible for floor control between members of each group that are participating in a group communication session. The group communications controller node 100 may also manage access to other communication resources as with a group communication session, e.g., network resources available to a given group communications session.

The FIG. 1 exemplary system 300 depicts a network 310 that includes the group communications controller node 100 and an intermediate network node 312 connected by a network link 314. The intermediate network node 312 in the network 310 also provides interconnectivity to network nodes that are external from the perspective of the network 310 via network link 316. Network link 316 is connected to another intermediate network node 320, which provides further connectivity to a plurality of access nodes 330, 340, 350 via network links 332, 342, 352, respectively.

Each access node 330, 340, 350 is depicted as providing connectivity to a plurality of N end nodes (334, 336), (344, 346), (354, 356), respectively, via corresponding access links (335, 337), (345, 347), (355, 357), respectively. In the exemplary system 300, each access node 330, 340, 350 is depicted as using wireless technology to provide access. A coverage area, e.g., communications cell, 338, 348, 358 of each access node 330, 340, 350, respectively, is illustrated as a circle surrounding the corresponding access node.

Alternative embodiments of the invention include various network topologies, where the number and type of network nodes, the number and type of links, and the interconnectivity between nodes may differ from that of the system 300 depicted in FIG. 1.

Figure 2:
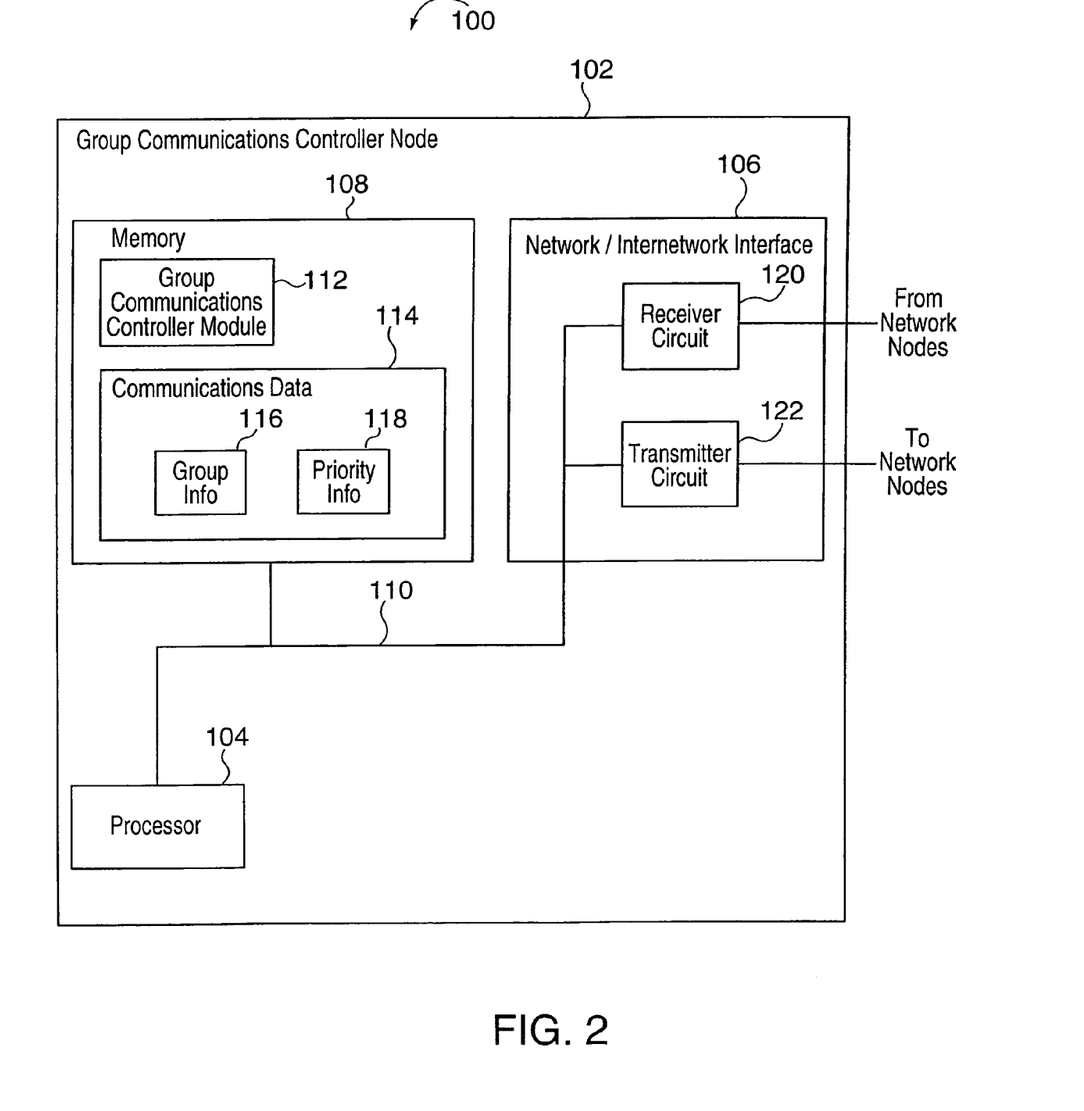
FIG. 2 illustrates a controller node implemented in accordance with the present invention.

FIG. 2 provides a detailed illustration of the exemplary group communications controller node 100 implemented in accordance with the present invention. The exemplary group communications controller node 100, depicted in FIG. 2, is a more detailed representation of the group communications controller node 100, depicted in FIG. 1. In the FIG. 2 embodiment, the group communications controller node 100 includes a processor 104, a network/internetwork interface 106 and memory 108, coupled together by bus 110. Accordingly, via bus 110 the various components of the group communications controller node 100 can exchange information, signals and data. The elements 104, 106, 108, 110 of the group communications controller node 100 are located inside a housing 102. The network/internetwork interface 106 provides a mechanism by which the internal components of the group communications controller node 100 can send and receive signals to/from external devices and network nodes. The network/internetwork interface 106 includes, a receiver circuit 120 and a transmitter circuit 122 used for coupling the node 100 to other network nodes, e.g., via fiber optic lines.

The processor 104 under control of various modules, e.g., routines, included in memory 108 controls operation of the group communications controller node 100 to perform various signaling, floor control, resource granting and other operations as will be discussed below. The modules included in memory 108 are executed on startup or as called by other modules. Modules may exchange data, information, and signals when executed. Modules may also share data and information when executed. In the FIG. 2 embodiment, the memory 108 of group communications controller node 100 of the present invention includes a group communications controller module 112 and communications data 114.

The group communications controller module 112 controls operation of the group communications controller node 100 to support floor control of group communication sessions. Thus, module 112 controls processing of received signals or messages requesting and/or releasing the communications resource and sending of subsequent signals or messaging as required to grant the resource or announce the release of said resource. Communications data 114 includes, e.g., parameters, configuration information, resource information, communication session information, end node status information and/or other information relating to end node interaction and/or group communications sessions. In particular, communications data 114 may include group information 116, e.g., information about the members of each group and the status of any corresponding group communication session, and priority information 118, e.g., information about the relative priority of group members. The group communications controller module 112 may access and/or modify the communications data 114 when executed. Thus, the group communications controller module 112 may access and update the group information 116 and priority information 118.

Figure 3:
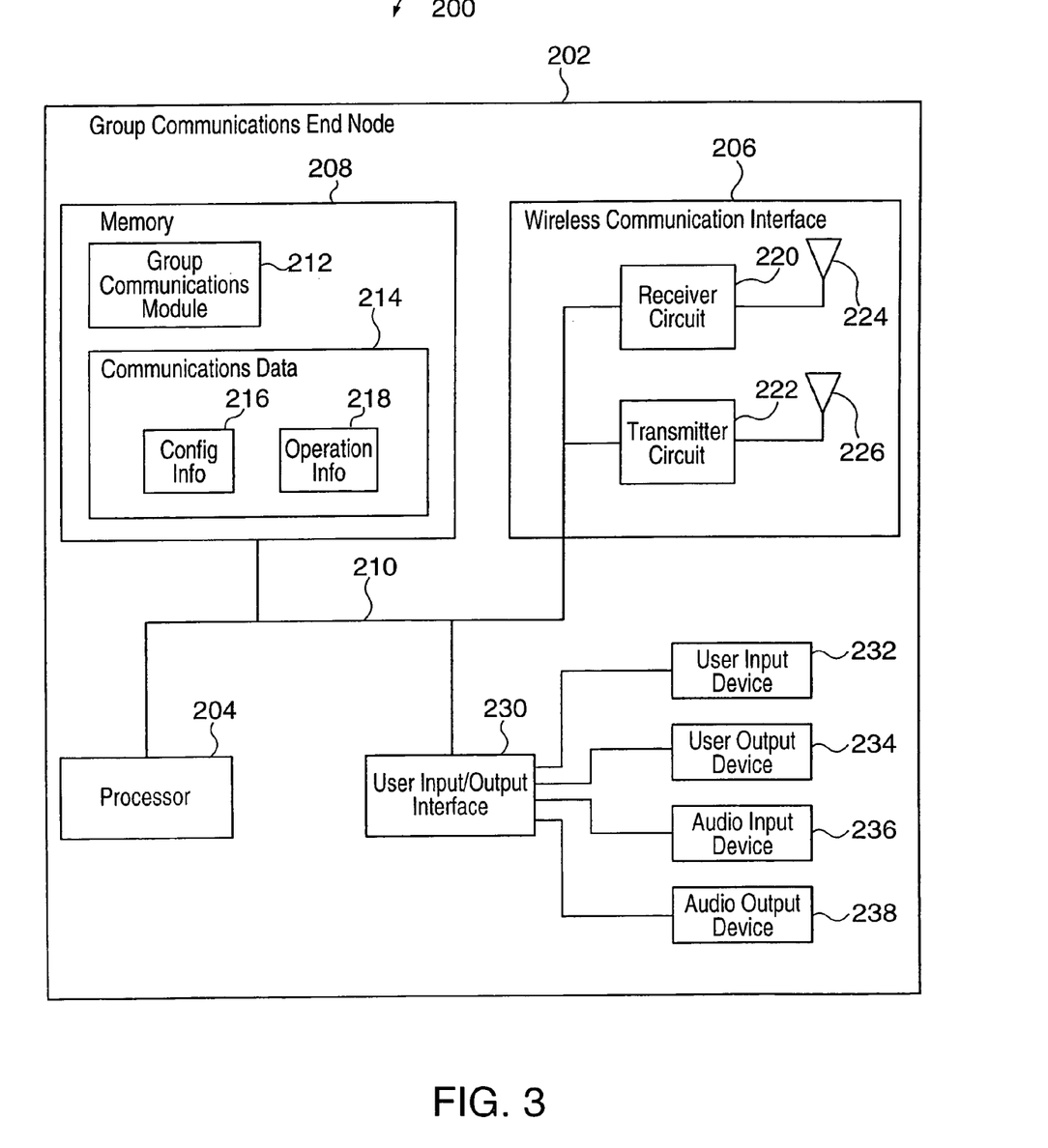
FIG. 3 illustrates an end node implemented in accordance with the present invention.

FIG. 3 provides a detailed illustration of an exemplary end node 200 implemented in accordance with the present invention. The exemplary end node 200, depicted in FIG. 3, is a detailed representation of an apparatus that may be used as any one of the end nodes 334, 336, 344, 346, 354, 356, depicted in FIG. 1. In the FIG. 3 embodiment, the end node 200 includes a processor 204, a wireless communication interface 206, a user input/output interface 230 and memory 208 coupled together by bus 210. Accordingly, via bus 210 the various components of the end node 200 can exchange information, signals and data. The exemplary end node 200 also includes a user input device 232, e.g., keypad, a user output device 234, e.g., display, an audio input device 236, e.g., microphone, and an audio output device 238, e.g., speaker, which are coupled to bus 210 via the user input/output interface 230. Thus, user input/output devices 232, 234, 236, 238 can exchange information, signals and data with other components of the end node 200 via user input/output interface 230 and bus 210. The elements 204, 206, 208, 230, 232, 234, 236, 238, 210 of the end node 200 are located inside a housing 202.

The wireless communication interface 206 provides a mechanism by which the internal components of the end node 200 can send and receive signals to/from external devices and network nodes. The wireless communication interface 206 includes, e.g., a receiver circuit 220 with a corresponding receiving antenna 224 and a transmitter circuit 222 with a corresponding transmitting antenna 226 used for coupling the node 200 to other network nodes, e.g., via wireless communications channels.

The processor 204 under control of various modules, e.g., routines, included in memory 208 controls operation of the end node 200 to perform various signaling, resource requesting/releasing, data communications and other operations as will be discussed below. The modules included in memory 208 are executed on startup or as called by other modules. Modules may exchange data, information, and signals when executed. Modules may also share data and information when executed. In the FIG. 3 embodiment, the memory 208 of end node 200 of the present invention includes a group communications module 212 and communications data 214.

The user input/output interface 230 and associated devices 232, 234, 236, 238 provide the means by which a user can operate the end node 200 to accomplish certain tasks. In particular, the user input device 232 and user output device 234 provide the functionality that allows a user to control the end node 200 and applications, e.g., modules, programs, routines and/or functions, that execute in the memory 208 of the end node 200. The audio input device 236 and audio output device 238 provide the functionality necessary to utilize the end node 200 for a voice communication session with another end node or group of end nodes.

The group communications module 212 controls operation of the end node 200 to participate in group communication sessions. Thus, module 212 controls sending of signals or messaging as required to request or release group communications resources and processing of received signals or messages granting and releasing group communications resources. Communications data 214 includes, e.g., parameters, configuration information, communication session information and/or other information relating to group communications sessions. In particular, communications data 214 may include configuration information 216, e.g., group membership information and relative priority of the encompassing end node 200 and/or associated user, and operational information 218, e.g., status of an active group communication session. The group communications module 212 may access and/or modify the communications data 214 when executed. Thus, the group communications module 212 may access and update the configuration information 216 and operational information 218.

Figure 4:
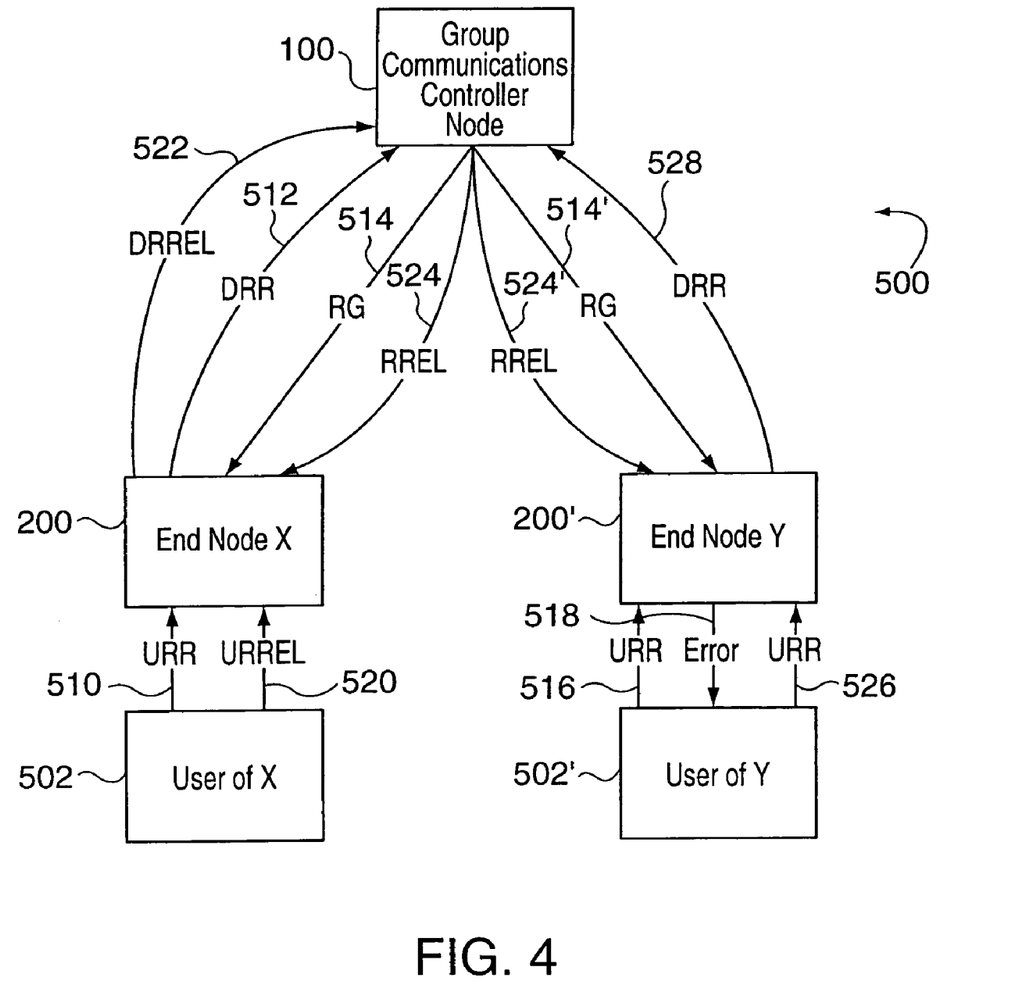
FIG. 4 illustrates signaling performed in the exemplary system as part of the processes of initiating and conducting a group o communication session between a first end node and another end node in accordance with an exemplary embodiment of the invention.

FIG. 4 provides an example of the signaling that may occur between an exemplary set of communications nodes 500 implemented according to this invention. The FIG. 4 embodiment comprises a plurality of end nodes 200, 200' implemented according to this present invention, e.g., as shown in FIG. 3, and a group communications controller node 100 also implemented according to this present invention, e.g., as shown in FIG. 2, where the end nodes 200, 200' and the group communications controller node 100 are part of communications system, e.g., as shown in FIG. 1, and thus are able to exchange communications signals, e.g., messages. FIG. 4 also depicts a plurality of users 502, 502', each associated with a corresponding end node 200, 200', respectively. Although not shown in FIG. 4, users 502, '502' interact with corresponding end nodes 200, 200' via the user input/output interface 230 and the associated devices 232, 234, 236, 238 shown in FIG. 3. Users 502, 502' operate their corresponding end nodes 200, 200' to participate in a group communication sessions, while the group communications controller node 100 is operates to provide floor control of said group communications session.

The following describes the events, signals, and operations associated with controlling access to a group communications resource associated with a group communications session. The arrows in FIG. 4 represent user input operations and signals, e.g., messages, used between users 502, 502', end nodes 200, 200' and group communications controller node 100 to request and grant access to the resources associated with the group communication session which in this case includes the right to send data. It is assumed that initially the end nodes are in an idle mode of operation and the group communications resource is available, i.e., no users associated with the group communications session are sending data.

In FIG. 4, the user 502 of end node X 200 performs a URR (User Resource Request) input operation 510, e.g., presses a key, causing an internal signal to be generated by user input device 232 of end node X 200. The URR input operation 510 and corresponding internal signal indicate that the user 502 of end node X 200 wants to send data. In response to the URR input operation 510, end node X 200 accesses its internal communications data 214 to determine if the group communications resource is currently granted to another group member. Since its internal communications data 214 indicates that the resource is available (in accordance with the initial assumption of this example), end node X 200 sends a corresponding DRR (Device Resource Request) signal 512 to the group communications controller node 100. The DRR signal 512 indicates that end node X 200 wants to send data to a particular group.

Upon reception of the DRR signal 512, the group communications controller node 100 accesses its internal communications data 114 to determine if the group communications resource should be granted in response to the DRR signal 512. In one embodiment of the present invention, this operation may simply be a determination of whether the requested group communications resource is available or is currently granted to another group member. In alternative embodiments, this operation may also include an assessment of the relative priority of the requesting group member and other factors to determine if the resource request should be granted, i.e., even if the resource is currently granted the relative priority of the group members could be used to selectively preempt an existing grant upon reception of a request from a higher priority user. In the FIG. 4 example, since the resource is available, the group communications controller node 100 grants end node X 200 and the corresponding user 502 the right to send data by sending a RG (Resource Grant) signal 514, 514' to end nodes, e.g., all end nodes, associated with members of the group. The RG signal 514 sent to end node X 200 includes sufficient information to indicate that the group communications resources has been granted to end node X and/or the corresponding user 502, while the RG signals 514' sent to end nodes associated with other group members need only indicate that the resource has been granted. In one embodiment of the present invention, the RG signal 514 sent to end node X 200 includes information that can be used to match the RG signal 514 with the previously sent DRR signal 512, e.g., a sequence number and/or identification value. In alternative embodiments, the RG signal 514 may also include information that identifies end node X 200 and/or the corresponding user 502. In some embodiments, the RG signals 514, 514' may include information that indicates the relative priority of the group member to which the group communications resource has been granted. Also, in some embodiments, the RG signals 514, 514' sent to end nodes, e.g., all end nodes, associated with members of the group may contain the same information, in which case the RG signals 514, 514' may be sent using broadcast or multicast.

Upon reception of the RG signal 514, end node X 200 enables its corresponding user 502 to start transmitting data to the group, e.g., sending voice via the audio input device 236 shown in FIG. 3. In some embodiments, end nodes 200, 200' may also provide an indication, e.g., visual and/or auditory signal, to their corresponding users 502, 502', respectively, that the group communications resource has been granted. Reception of the RG signal 514' by end node Y 200' indicates that the group communications resource has been granted to another member of the group, in this case user 502 of end node X 200. Upon reception the RG signal, end node Y 200' changes from an idle mode to a suppression mode of operation, during which end node Y 200' will suppress resource request attempts made by its corresponding user 502'. While in the suppression mode, end node Y 200' may receive data sent to the communications group, e.g., voice data sent from the user 502 of end node X 200. In the exemplary embodiment end node Y also provides the received data to its corresponding user 502', e.g., sending voice via the audio output device 238 shown in FIG. 3.

The FIG. 4 example further illustrates the events, signals and operations that occur when the user 502' of end node Y 200' attempts to request resources associated with the same communications group for which the resources have already been granted to the user 502 of end node X 200. The user 502' of end node Y 200' performs a URR input operation 516, e.g., presses a key, causing an internal signal to be generated by user input device 232' of end node Y 200'. The URR input operation 516 and corresponding internal signal indicate that the user 502' of end node Y 200' wants to send data. In response to the URR input operation 516, end node Y 200' accesses its internal communications data 214' to determine if the group communications resource is currently granted to another end node, i.e., if end node Y 200' is in the suppression mode. According to one embodiment of the present invention, since its internal communications data 214' indicates that the resource is currently granted to another end node and end node Y 200' is in the suppression mode, end node Y 200' immediately returns an error signal 518 to its corresponding user, e.g., a visual and/or auditory signal via the respective output device 234', 238'. In an alternative embodiment, end node Y 200' may store an indication that a URR input operation 516 was performed by its corresponding user 502' and not return an error message. If the group communications resource is subsequently released, the stored indication that a URR input operation 516 was performed will be used to determine if a DRR signal should be sent to the group communications controller node. Also, in some embodiments, in response to the URR input operation, end node Y 200' may compare the relative priority of its corresponding user 502' with the priority at which the group communications resource is currently granted to another user, to determine whether a DRR signal (not shown) should be sent to the group communications controller node 100 to preempt the existing resource grant, as opposed to either sending an error signal 518 or storing an indication that a URR input operation was performed.

The FIG. 4 example also illustrates the events, signals and operations that occur when the user 502 of end node X 200 releases the resources that have been granted to it. At some point later the user 502 of end node X 200 ends its transmission of data and releases the resources by performing a URREL (user Resource Release) input operation 520 e.g., presses or releases a key, causing an internal signal to be generated by user input device 232 of end node X 200. In response to the URREL input operation 520, end node X 200 end node X 200 sends a corresponding DRREL (Device Resource Release) signal 522 to the group communications controller node 100. Upon reception of the DRREL signal, the group communications controller node 100 notifies members, e.g. all members, of the group that resources for that group are now available by sending a RREL (Resource Release) 524, 524' signal to end nodes associated with members of the group. The group communications controller node may use a variety of scheduling methods to determine the order and timing with which RREL signals 524, 524' are sent to end nodes associated with group members. In some embodiments, the RREL signals 524, 524' sent to end nodes associated with group members may contain the same information, in which case the RREL signals 524, 524' may be sent using broadcast or multicast Upon reception of the RREL signal 524', end node Y 200' changes from suppression mode to an idle mode of operation. Provided that end node Y 200' had stored an indication that a URR input operation was performed while end node Y 200' was in the suppression mode, end node Y 200' would immediately send a DRR signal (not shown) to the group communications controller node 100. In some embodiments, end nodes 200, 200' may also provide an indication, e.g., visual and/or auditory signal, to their corresponding users 502, 502', respectively, that the group communications resource has been released. The FIG. 4 example further illustrates a resource request from end node Y 200' that occurs after the group communications resource has been released by end node X 200. The user 502' of end node X 200' performs a URR input operation 526 to end node Y 200'. In response to the URR input operation 526, end node Y 200' sends a DRR signal 528 to the group communications controller node 100. Upon reception of the DRR signal 528, the group communications controller node 100, will determine whether the resource should be granted to end node Y 200', as it did for end node X 200 at the beginning of the FIG. 4 description.

Figure 5:
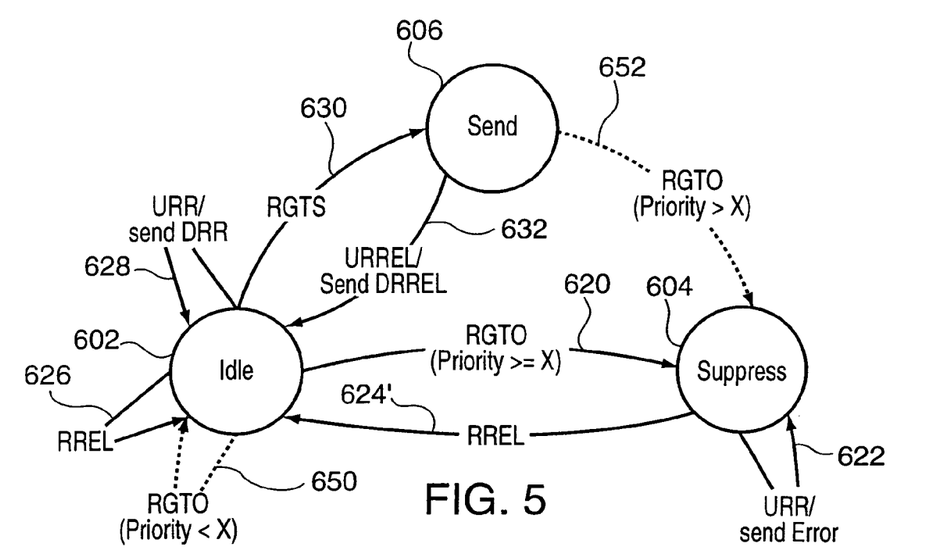
FIG. 5 illustrates the state transition diagram of an end node implemented in accordance with an exemplary embodiment of the invention
Figure 6:
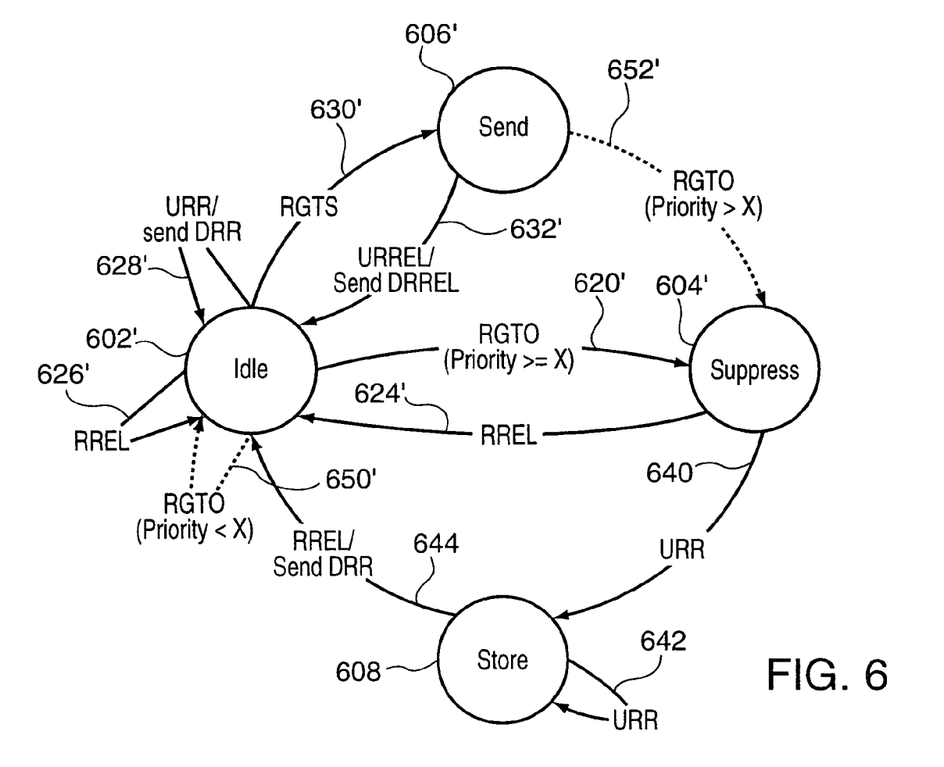
FIG. 6 illustrates the state transition diagram of an end node implemented in accordance with another exemplary embodiment of the invention

FIGS. 5 and 6 depict exemplary state machines that may operate in an end node 200 implemented according to this present invention, e.g., as shown in FIG. 3. The end node is operated by a user member of a communications group as part of communication system, e.g., as shown in FIGS. 1 and 4. Group communications sessions are controlled by a group communications controller node 100 implemented according to the present invention, e.g., as shown in FIG. 2. In FIGS. 5 and 6, operational states are depicted as circles, while arrows between the states indicate state transitions according to this invention. Dotted arrows and text in parenthesis "( )" indicate features present in an alternative embodiment of this invention which is also described in detail below.

The FIG. 5 embodiment depicts three operational states, idle 602, suppress 604 and send 606. While in any of these states, an end node implemented according to this invention monitors the input/output interface 230 for user input operations and the communication channel for floor control signals, e.g., messages, from the group communications controller node. In idle state 602, the end node monitors for input operations and other signals that may trigger a change in operational state. In suppress state 604, the end node additionally operates such that it suppresses requests for resources from the user. The end node 200 transitions to the send state 606 when it has been granted the communications resource; thus, while in the send state 606, the end node may transmit data to the group.

In one embodiment of this invention, when signal RGTO (Resource Grant to Other) is received while in the idle state 602, the end node makes a transition 620 to the suppress state, since signal RGTO indicates that resources were granted to another member of the group. In one embodiment of this invention, reception of a URR input operation while in the suppress state 604 results in the suppression of the resource request and transmission of an error message to the user indicating that resources for that group are not available and the return 622 to the same suppress state 604. Upon reception of a RREL signal while in the suppress state 604, indicating that the resources for said group have been released, the end node makes a transition 624 back to the idle state 602. Reception of a RREL signal while in idle state causes the end node to return 626 to the same idle state 602. According to this invention, when a URR input operation is received while in the idle state 602, the end node sends a DRR signal to the group communications controller node and returns 628 to the same idle state 602. If the controller grants the resources requested, a RGTS (Resource Grant to Self) signal will be received while the end node is still in the idle state 602. When a RGTS signal is received while in the idle state 602, the end node makes a transition 630 to the send state 606 and the user can now transmit data to the group. When the user data transmission is complete and the user releases the resources by performing a URREL input operation. When a URREL input operation is received while in the send state 606, the end node makes a transition 632 from the send state 606 to the idle state 602 and sends a DRREL signal to the group communications controller node.

In some alternative embodiments of this invention, a relative priority may be associated with each group member and some of the signals sent between nodes may also include an indication of relative priority. In one particular embodiment of this invention reception of a RGTO signal by a end node while in idle state 602, cause a transition 620 to the suppress state 604 only if the priority level indicated in the RGTO signal is higher than or equal that owned by the user of the said end node. A RGTO signal indicating a lower relative priority than that owned by the user of the said end node causes the end node to return 650 to the same idle state 602. In the latter case, the user can still request resources for this group by performing a URR input operation and interrupt, e.g., pre-empt, the user with a lower relative priority that has been granted access to the resources. Accordingly, reception of a RGTO signal by an end node while in the send state 606, may indicate that the resource has been granted to another user with a higher relative priority that of said end node. In which case, the end node makes a transition 652 from the send state 606 to the suppress state 604.

FIG. 6 depicts an alternative exemplary state machine that may operated in an end node according to this invention. States and signals are the same with that of the FIG. 5 example, with the following exceptions: the addition of a new state called the store state 608, the addition of new transitions 640, 642, 644, and the removal of return 622. In this alternative embodiment of the invention, reception of a URR input operation by the end node while in suppress state 604', causes a transition 640 to the store state 608. In the store state 608, the end node effectively stores the user requests for resources. Any additional URR input operations received while in the store state 608 cause the end node to replace the stored URR input operation information with information regarding the new URR input operation before it returns 642 to the same store state 608. When a RREL signal is received while in this store state 608, the end node sends a DRR signal to the group communications controller node according to the last URR input operation that was received and makes a transition 644 to the idle state 602.

In an alternative embodiment of this present invention, when the end node is in the store state 608, it can also receive a URREL signal from the user indicating that the user no longer requires resources for this group, in which case the end node will transition (not shown in the figure) back to suppress state.

In some alternative embodiments of the present invention, communications between nodes is based all, or in part, on the Internet Protocol (IP). Thus, communication of both data and/or control signaling between members of a communica tions group, end nodes associated with group members and the group communications controller node may use IP packets, e.g., datagrams. IP packets may be delivered to the their intended destination nodes using either unicast or multicast addressing and delivery mechanisms. The use of IP multicast is particular useful when the same information is sent from one node to a plurality of other nodes. This is typically the case for data communications between group members, and may also be the case for certain control signals that target a plurality of nodes, e.g., the RG signal 514, 514' and the RREL signal 524, 524' depicted in FIG. 4. In cases where the same information, e.g., packet payload data, is sent to a plurality of targeted nodes using unicast delivery, a separate IP packet with a copy of the information is sent by the source node to each targeted node. Alternatively, when the same information is sent to a plurality of targeted nodes using multicast delivery, a single IP packet with the information is sent by the source node and network nodes replicate the packet as required for delivery to each targeted node. Thus, IP multicast provides a more efficient means of delivering information from a source node to a group of destination nodes.

In some alternative embodiments of the present invention, the exchange of control signals, e.g., messages, between nodes is based all, or in part, on the Session Initiation Protocol (SIP). SIP messaging may be used both for the initial establishment of a group communications session and for the signaling associated with arbitration and control of access to group communications resources. SIP messaging may be sent using either unicast or multicast delivery mechanisms. Group communications resource control messaging may also be unified and/or integrated with control messaging associated with establishment, maintenance and teardown of group communications session and/or with control messaging associated with maintenance of group member presence information.

Additional aspects, features, methods, apparatus and exemplary embodiments which are part of the inventive methods and apparatus, to which the present patent application is directed, are described in U.S. Provisional Patent Application Ser. No. 60/301,239, filed on Jun. 27, 2001, titled "METHODS AND APPARATUS FOR USING SIP SIGNALING TO SUPPORT GROUP COMMUNICATIONS OVER FLASH-OFDM" which is cited in the related applications section of the present application and which is hereby expressly incorporated by reference.

As a result of the above incorporation by reference, the text and figures of the listed provisional patent application form part of the present description. It is to be understood that the reference numerals used in the text and figures of the provisional patent application are to be interpreted in the context of the incorporated provisional application and are not to be interpreted as the same as any similarly numbered element or elements described in the above text or the figures which are included herein without the use of an incorporation by reference. It is to be further understood that mandatory language, if any, in the incorporated provisional application such as "must", "only", etc., is to be interpreted as being limited to the exemplary embodiments described in the provisional application and is not to be interpreted as a limitation on the embodiments, figures, and claims of the present application which are not incorporated by reference.

What is claimed is:

1. A group communications method comprising:
   operating a group communications control unit to receive a communications resource request from a first mobile communications device belong to a group including said first mobile communications device and a plurality of additional communications devices;
   operating said group communications control unit to broadcast a first IP message including a multicast address corresponding to said group and a resource grant to said first communications device.

2. The group communications method of claim 1, further comprising:
   operating at least some of said plurality of additional communications devices to receive said first IP message; and
   operating said at least some of said plurality of additional communications devices to suppress the generation of group resource requests in response to receiving said first IP message.

3. The group communications method of claim 2, further comprising:
   operating said group communications control unit to broadcast a second IP message including a multicast address corresponding to said group, said second IP message also including a resource release message.

4. The group communications method of claim 3, further comprising;
   operating at least one of said at least some of said plurality of additional communications devices to stop suppressing the generation of resource requests in response to said second IP message.

5. The group communications method of claim 2, further comprising:
   operating said group communications control unit to broadcast a second IP message including a multicast address corresponding to said group, said second IP message also including a resource release message indicating the release of the resource granted to said first communications device.

6. The group communications method of claim 2, wherein said group communications control unit includes a grant priority level indicator in said first IP message.

7. A control unit for controlling resource grants in a group communications environment, the controller comprising:
   means for receiving a communications resource request from a first mobile communications device belong to a group including said first mobile communications device and a plurality of additional communications devices;
   means for generating a first IP message including a multicast address corresponding to said group and a resource grant to said first communications device; and
   means for broadcasting a first IP message.

8. The control unit of claim 7, further comprising:
   means for processing a resource release signal received from said first mobile communications device;
   means for generating a second IP message including a multicast address corresponding to said group and a resource message indicating release of the resource granted to said first communications device; and
   means for broadcasting the second IP message.

9. The control unit of claims 8, wherein said means for broadcasting a first IP message includes an antenna.

* * * * *